(12) United States Patent
Kameoka et al.

(10) Patent No.: US 7,591,883 B2
(45) Date of Patent: Sep. 22, 2009

(54) MICROFIBER SUPPORTED NANOFIBER MEMBRANE

(75) Inventors: Jun Kameoka, College Station, TX (US); Keiyo Nakano, Aichi (JP)

(73) Assignee: Cornell Research Foundation, Inc., Ithaca, NY (US)

( * ) Notice: Subject to any disclaimer, the term of this patent is extended or adjusted under 35 U.S.C. 154(b) by 486 days.

(21) Appl. No.: 11/262,550

(22) Filed: Oct. 28, 2005

(65) Prior Publication Data

US 2006/0068668 A1    Mar. 30, 2006

Related U.S. Application Data

(63) Continuation-in-part of application No. 10/951,254, filed on Sep. 27, 2004.

(51) Int. Cl.
*B01D 46/00* (2006.01)
*B01J 19/08* (2006.01)

(52) U.S. Cl. .................. 95/273; 95/45; 96/11; 55/486; 55/487; 55/524; 55/528; 55/DIG. 5; 442/36; 442/345; 210/500.27; 264/10; 264/466; 264/DIG. 48; 427/245; 427/458; 427/462

(58) Field of Classification Search .................. 55/482, 55/486, 487, 524, 527, 528, DIG. 5; 95/273, 95/45; 96/11; 442/36, 345; 210/500.21, 210/500.27; 264/10, 465, 466, DIG. 48; 427/245, 458, 462
See application file for complete search history.

(56) References Cited

U.S. PATENT DOCUMENTS

| | | | |
|---|---|---|---|
| 3,994,258 A * | 11/1976 | Simm .......................... 264/10 |
| 4,127,706 A * | 11/1978 | Martin et al. ................. 264/10 |
| 4,443,319 A | 4/1984 | Chait et al. |
| 4,483,885 A | 11/1984 | Chait et al. |
| 4,963,736 A | 10/1990 | Douglas et al. |
| 5,296,114 A | 3/1994 | Manz |
| RE34,757 E | 10/1994 | Smith et al. |
| 5,393,975 A | 2/1995 | Hail et al. |
| 5,423,964 A | 6/1995 | Smith et al. |
| 5,599,432 A | 2/1997 | Manz et al. |
| 5,624,539 A | 4/1997 | Ewing et al. |
| 5,672,399 A * | 9/1997 | Kahlbaugh et al. ............ 55/527 |

(Continued)

FOREIGN PATENT DOCUMENTS

EP     0653631 B1    5/1995

(Continued)

OTHER PUBLICATIONS

"Advanced BioAnalytical Services, Inc. Gains Patent Rights to Novel Microfluidic Handling System", http://www.advion.com/neulicensepress1.html (Archived Apr. 10, 2001).

(Continued)

*Primary Examiner*—Jason M Greene
(74) *Attorney, Agent, or Firm*—Schwegman, Lundberg & Woessner, P.A.

(57) ABSTRACT

A nanofiber membrane is formed on a microfiber membrane. The nanofiber membrane may be electro sprayed directly onto the microfiber membrane and becomes integrated with the microfiber membrane to form a filter. The microfiber membrane provides structural integrity to for the nanofiber membrane, and an additional microfiber membrane may be added to sandwich the nanofiber membrane.

15 Claims, 3 Drawing Sheets

U.S. PATENT DOCUMENTS

| | | | |
|---|---|---|---|
| 5,705,813 A | 1/1998 | Apffel et al. |
| 5,716,825 A | 2/1998 | Hancock et al. |
| 5,800,690 A | 9/1998 | Chow et al. |
| 5,833,861 A | 11/1998 | Afeyan et al. |
| 5,856,671 A | 1/1999 | Henion et al. |
| 5,858,188 A | 1/1999 | Soane et al. |
| 5,858,195 A | 1/1999 | Ramsey |
| 5,866,345 A | 2/1999 | Wilding et al. |
| 5,872,010 A | 2/1999 | Karger et al. |
| 5,885,470 A | 3/1999 | Parce et al. |
| 5,917,184 A | 6/1999 | Carson et al. |
| 5,935,401 A | 8/1999 | Amigo |
| 5,958,202 A | 9/1999 | Regnier et al. |
| 5,965,001 A | 10/1999 | Chow et al. |
| 5,969,353 A | 10/1999 | Hsieh |
| 5,993,633 A | 11/1999 | Smith et al. |
| 5,994,696 A | 11/1999 | Tai et al. |
| 6,001,229 A | 12/1999 | Ramsey |
| 6,010,607 A | 1/2000 | Ramsey |
| 6,010,608 A | 1/2000 | Ramsey |
| 6,012,902 A | 1/2000 | Parce |
| 6,033,546 A | 3/2000 | Ramsey et al. |
| 6,033,628 A | 3/2000 | Kaltenbach et al. |
| 6,054,034 A | 4/2000 | Soane et al. |
| 6,056,860 A | 5/2000 | Amigo et al. |
| 6,068,749 A | 5/2000 | Karger et al. |
| 6,086,243 A | 7/2000 | Paul et al. |
| 6,110,343 A | 8/2000 | Ramsey et al. |
| 6,123,798 A | 9/2000 | Gandhi et al. |
| 6,139,734 A | 10/2000 | Settlage et al. |
| 6,149,870 A | 11/2000 | Parce et al. |
| 6,156,181 A | 12/2000 | Parce et al. |
| 6,159,739 A | 12/2000 | Weigl et al. |
| 6,176,962 B1 | 1/2001 | Soane et al. |
| 6,187,190 B1 | 2/2001 | Smith et al. |
| 6,231,737 B1 | 5/2001 | Ramsey et al. |
| 6,238,538 B1 | 5/2001 | Parce et al. |
| 6,240,790 B1 | 6/2001 | Swedberg et al. |
| 6,245,227 B1 | 6/2001 | Moon et al. |
| 6,277,641 B1 | 8/2001 | Yager |
| 6,280,589 B1 | 8/2001 | Manz et al. |
| 6,284,113 B1 | 9/2001 | Bjornson et al. |
| 6,284,115 B1 | 9/2001 | Apffel |
| 6,318,970 B1 | 11/2001 | Backhouse |
| 6,322,682 B1 | 11/2001 | Arvidsson et al. |
| 6,337,740 B1 | 1/2002 | Parce |
| 6,342,142 B1 | 1/2002 | Ramsey |
| 6,368,562 B1 | 4/2002 | Yao |
| 6,375,817 B1 | 4/2002 | Taylor et al. |
| 6,394,942 B2 | 5/2002 | Moon et al. |
| 6,409,900 B1 | 6/2002 | Parce et al. |
| 6,413,401 B1 | 7/2002 | Chow et al. |
| 6,416,642 B1 | 7/2002 | Alajoki et al. |
| 6,417,510 B2 | 7/2002 | Moon et al. |
| 6,422,848 B1* | 7/2002 | Allen et al. ................ 425/7 |
| 6,423,198 B1 | 7/2002 | Manz et al. |
| 6,432,311 B2 | 8/2002 | Moon et al. |
| 6,444,461 B1 | 9/2002 | Knapp et al. |
| 6,450,047 B2 | 9/2002 | Swedberg et al. |
| 6,450,189 B1 | 9/2002 | Ganan-Calvo |
| 6,454,924 B2 | 9/2002 | Jedrzejewski et al. |
| 6,454,938 B2 | 9/2002 | Moon et al. |
| 6,459,080 B1 | 10/2002 | Yin et al. |
| 6,461,516 B2 | 10/2002 | Moon et al. |
| 6,462,337 B1 | 10/2002 | Li et al. |
| 6,464,866 B2 | 10/2002 | Moon et al. |
| 6,465,776 B1 | 10/2002 | Moini et al. |
| 6,475,363 B1 | 11/2002 | Ramsey |
| 6,475,441 B1 | 11/2002 | Parce et al. |
| 6,481,648 B1 | 11/2002 | Zimmermann |
| 6,491,804 B2 | 12/2002 | Manz et al. |
| 6,495,016 B1 | 12/2002 | Nawracala |
| 6,500,323 B1 | 12/2002 | Chow et al. |
| 6,514,399 B1 | 2/2003 | Parce et al. |
| 6,517,234 B1 | 2/2003 | Kopf-Sill et al. |
| 6,524,456 B1 | 2/2003 | Ramsey et al. |
| 6,541,768 B2 | 4/2003 | Andrien, Jr. et al. |
| 6,555,067 B1 | 4/2003 | Gandhi et al. |
| 6,562,282 B1* | 5/2003 | Arseneau et al. ............ 264/555 |
| 6,569,324 B1 | 5/2003 | Moon et al. |
| 6,576,896 B2 | 6/2003 | Figeys et al. |
| 6,596,988 B2 | 7/2003 | Corso et al. |
| 6,602,472 B1 | 8/2003 | Zimmermann et al. |
| 6,605,472 B1 | 8/2003 | Skinner et al. |
| 6,607,644 B1 | 8/2003 | Apffel, Jr. |
| 6,621,076 B1 | 9/2003 | Van de Goor et al. |
| 6,627,076 B2 | 9/2003 | Griffiths |
| 6,627,882 B2 | 9/2003 | Schultz et al. |
| 6,632,655 B1 | 10/2003 | Mehta et al. |
| 6,653,625 B2 | 11/2003 | Andersson et al. |
| 6,656,394 B2* | 12/2003 | Kelly ...................... 264/10 |
| 6,681,788 B2 | 1/2004 | Parce et al. |
| 6,695,009 B2 | 2/2004 | Chien et al. |
| 6,709,559 B2 | 3/2004 | Sundberg et al. |
| 6,733,645 B1 | 5/2004 | Chow |
| 6,744,046 B2 | 6/2004 | Valaskovic et al. |
| 6,803,568 B2 | 10/2004 | Bousse et al. |
| 6,814,859 B2 | 11/2004 | Koehler et al. |
| 6,827,095 B2 | 12/2004 | O'Connor et al. |
| 6,991,702 B2* | 1/2006 | Kim ....................... 264/465 |
| 2001/0037979 A1 | 11/2001 | Moon et al. |
| 2002/0036140 A1 | 3/2002 | Manz et al. |
| 2002/0041827 A1 | 4/2002 | Yager et al. |
| 2002/0090725 A1 | 7/2002 | Simpson et al. |
| 2002/0100714 A1 | 8/2002 | Staats |
| 2002/0110902 A1 | 8/2002 | Prosser et al. |
| 2002/0117517 A1 | 8/2002 | Unger et al. |
| 2002/0121487 A1 | 9/2002 | Robotti et al. |
| 2002/0123153 A1 | 9/2002 | Moon et al. |
| 2002/0139931 A1 | 10/2002 | Yin et al. |
| 2002/0158195 A1 | 10/2002 | Andersson et al. |
| 2002/0170825 A1 | 11/2002 | Lee et al. |
| 2002/0182649 A1 | 12/2002 | Weinberger et al. |
| 2003/0000835 A1 | 1/2003 | Witt et al. |
| 2003/0017609 A1 | 1/2003 | Yin et al. |
| 2003/0026740 A1 | 2/2003 | Staats |
| 2003/0029724 A1 | 2/2003 | Derand et al. |
| 2003/0047680 A1 | 3/2003 | Figeys et al. |
| 2003/0066959 A1 | 4/2003 | Andersson et al. |
| 2003/0073260 A1 | 4/2003 | Corso |
| 2003/0082080 A1 | 5/2003 | Zimmermann et al. |
| 2003/0089605 A1 | 5/2003 | Timperman |
| 2003/0089606 A1 | 5/2003 | Parce et al. |
| 2003/0106294 A1* | 6/2003 | Chung et al. ................ 55/486 |
| 2003/0106799 A1 | 6/2003 | Covington et al. |
| 2003/0111599 A1 | 6/2003 | Staats |
| 2003/0146757 A1 | 8/2003 | Aguero et al. |
| 2003/0148922 A1 | 8/2003 | Knapp et al. |
| 2003/0153007 A1 | 8/2003 | Chen et al. |
| 2003/0180965 A1 | 9/2003 | Yobas et al. |
| 2003/0195611 A1* | 10/2003 | Greenhalgh et al. .......... 264/10 |
| 2003/0213918 A1 | 11/2003 | Kameoka et al. |
| 2003/0215855 A1 | 11/2003 | Dubrow et al. |
| 2004/0053333 A1 | 3/2004 | Hitt et al. |
| 2004/0075050 A1 | 4/2004 | Rossier et al. |
| 2004/0096960 A1 | 5/2004 | Mehta et al. |
| 2004/0159783 A1 | 8/2004 | Gavin et al. |
| 2005/0123688 A1 | 6/2005 | Craighead et al. |

FOREIGN PATENT DOCUMENTS

| | | |
|---|---|---|
| GB | 2379554 | 3/2003 |
| WO | WO-9111015 A1 | 7/1991 |
| WO | WO-9604547 A1 | 2/1996 |

| | | |
|---|---|---|
| WO | WO-9636425 A1 | 11/1996 |
| WO | WO-0041214 A1 | 7/2000 |
| WO | WO-0062039 A1 | 10/2000 |
| WO | WO-0230486 A3 | 4/2002 |
| WO | WO-0245865 A1 | 6/2002 |
| WO | WO-0247913 A1 | 6/2002 |
| WO | WO-02055990 A2 | 7/2002 |
| WO | WO-02080222 A1 | 10/2002 |
| WO | WO-03004160 A1 | 1/2003 |
| WO | WO-03019172 A2 | 3/2003 |
| WO | WO-03054488 A1 | 7/2003 |
| WO | WO-2004044574 A1 | 5/2004 |
| WO | WO-2004051697 A2 | 6/2004 |
| WO | WO-2004062801 A1 | 7/2004 |
| WO | WO-2004067162 A2 | 8/2004 |
| WO | WO-2004070051 A2 | 8/2004 |

OTHER PUBLICATIONS

"Applied Biosystems, Northeastern University and Professor Barry L. Karger, Ph.D. Form Collaboration to Research Advances in Separation Technology for Proteomics", http://www.applera.com/press/prccorp111901a.html (Archived Jun. 21, 2002).

"Automated Nanospray", http://www.advion.com/advion_aufiles/AutomatedNanospray/sld001.htm (Archived Jun. 16, 2002), 13 Pages.

"Coming Soon . . . The Advion NanoMate 100", http://www.advion.com/ (archived Apr. 5, 2001), 6 pages.

"Disposable Nano-Electrospays", http://www.diagnoswiss.com/products/disp_nano_electr.html (Archived Jun. 5, 2002), 1-2.

Auriola, Seppo, et al., "Enhancement of sample loadings for the analysis of oligosaccharides isolated from Pseudomonas aeruginosa using transient isotachophoresis and capillary zone electrophoresis—electrospray—mass spectrometry", Electrophoresis 1998, 19, (1998),2665-2676.

Balaguer, E., et al., "Comparison of Sheathless and Sheath Flow Electrospray Interfaces for On Line Capillary Electrophoresis Mass Spectrometry of Therapeutic Peptide Hormones", 1 page.

Banks, J. F., "Recent advances in capillary electrophoresis/electrospray/mass spectrometry", Electrophoresis 1997, 18, (1997),2255-2266.

Banks, Jr., J. F., et al., "Detection of fast Capillary Electrophoresis Peptide and Protein Separations Using electrospray Ionization With a Time0of-Flight Mass Spectrometer", Anal. Chem., 68, (1996), 1480-1485.

Becker, Holger, et al., "Polymer microfluidic devices", Talanta 56, (2002),267-287.

Bings, Nicolas H., et al., "Microfluidic Devices Connected to Fused-Silica Capillaries with Minimal Dead Volume", Anal. Chem., 71, (1999),3292-3296.

Cao, Ping, et al., "Analysis of Peptides, Proteins, Protein Digests, and whole Human Blood by Capillary Electrophoresis/Electrospray Ionization-Mass Spectrometry Using an In-capillary Electrode Sheathless Interface", J. Am. Soc. Mass Spectrom 1998, 9, (1998),1081-1088.

Chan, Jason H., et al., "Microfabricated Polymer Devices for Automated Sample Delivery of Peptides for Analysis by Electrospray Ionization Tandem Mass Spectrometry", Anal. Chem., 71, (1999),4437-4444.

Chang, Yan Z., et al., "Sheathless Capillary Electrophoresis/Electrospray Mass Spectrometry Using a Carbon-Coated Fused-Silica Capillary", Anal. Chem., 72, (2000),626-630.

Chen, Shu-Hui, et al., "A Disposable poly(methylmethacrylate)-base microfluidic module for protein identification by nanoelectrospray ionization-tandem mass spectrometry", Electrophoresis 2001, 22, (2001),3972-3977.

Chen, Yet-Ran, et al., "A Low-Flow CE/Electrospray Ionization MS Interface for Capillary Zone Electrophoresis Large-Volume Sample Stacking, and Micellar Electrokinetic Chromatography", Anal. Chem., 75, (2003),503-508.

Chien, Ring-Ling, et al., "Sample Stacking of an Extremely Large Injection Volume in High-Performance Capillary Electrophoresis", Anal. Chem., 64, (1992),1046-1050.

Chiou, Chi-Han, et al., "Micro devices intergrated with microchannels and electrospray nozzels using PDMS casting techniques", Sensors and Actuators B, 4311,(2002), 1-7.

Czaplewski, David A., et al., "Nanofluidic Channels with Elliptical Cross Sections", Applied Physics Letters, 83(23), (Dec. 8, 2003), 4836-4838.

Czaplewski, David A., et al., "Nanomechanical Oscillators Fabricated Using Polymeric Nanofiber Templates", Nano Letters, 4, (2004),437-439.

Czaplewski, David A., et al., "Nonlithographic Approach to Nanostructure Fabrication Using a Scanned Electrospinning Source", Journal of Vacuum Science & Technology B: Microelectronics and Nanometer Structures, 21(6), (Nov. 2003),2994-2997.

Deng, Yuzhong, et al., "Chip-Based Quantitative Capillary Electrophoresis/Mass Spectrometry Determination of Drugs in Human Plasma", Anal. Chem., 73, (2001), 1432-1439.

Ding, Jianmei, et al., "Advances in CE/MS—Recent developments in interfaces and applications", Analytical Chemistry News & Features, (1999), 18 pgs.

Figeys, Daniel, et al., "A Microfabricated Device for Rapid Protein Identification by Microelectrospray Ion Trap Mass Spectrometry", Anal. Chem., 69, (1997),3153-3160.

Figeys, Daniel, et al., "High Sensitivity Analysis of Proteins and Peptides by Capillary Electrophoresis—Tandem Mass Spectrometry: Recent Developments in Technology and Applications", Electrophoresis, 19, (1998),885-892.

Figeys, Daniel, et al., "Nanoflow Solvent Gradient Delivery from a Microfabricated Device for Protein Identifications by Electrospray Ionization Mass Spectrometry", Anal. Chem., 70, (1998),3721-3727.

Figeys, Daniel, et al., "Protein identification by Solid Phase Microextraction—Capillary Zone Electrophoresis—Microelectrospray—Tandem mass Spectrometry", Nature Biotechnology, 14, (1996), 1579-1583.

Foret, Frantisek, et al., "Trace Analysis of Proteins by Capillary Zone Electrophoresis With On-Column Transient Isotachophoretic Preconcentration", Electrophoresis, 14, (1993),417-428.

Geromanos, Scott, et al., "InJection adaptable Fine Ionization Source ('JaFIS') for Continuous Flow Nano-Electrospray", Rapid Commun. Mass Spectrom., 12, (1998),551-556.

Geromanos, Scott, et al., "Tuning of an Electrospray Ionization Source for Maximum Peptide-Ion Transmission into a Mass Spectrometer", Anal. Chem., 72, (2000),777-790.

Gobry, Veronique, et al., "Microfabricated Polymer Injector for Direct Mass Spectrometry Coupling", Proteomics, 2, (2002),405-412.

Guo, Xu, et al., "Analysis of Metallothioneins by Means of Capillary Electrophoresis Coupled to Electrospray Mass Spectrometry with Sheathless Interfacing", Rapid Commun. Mass Spectrom., 13, (1999),500-507.

Hayes, Roger N., et al., "[10] Collision-Induced Dissociation", Methods of Enzymology, 193, (1990),237-263.

Issaq, Haleem J., et al., "SELDI-TOF MS for diagnostic Proteomics", Analytical Chemistry, (2003), 149-155.

Janini, George M., et al., "A Sheathless Nanoflow Electrospray Interface for On-Line Capillary Electrophoresis Mass Spectrometry", Anal. Chem., 75, (2003), 1615-1619.

Jiang, Yun, et al., "Integrated Plastic Microfluidic Devices with ESI-MS for Drug Screening and residue Analysis", Anal. Chem., 73, (2001),2048-2053.

Johansson, I. M., et al., "Capillary Electrophoresis-Atmospheric Pressure Ionization mass Spectrometry for the Characterization of Peptides", Journal of Chromatography, 554, (1991),311-327.

Kaiser, Thorsten, et al., "Capillary Electrophoresis Coupled to Mass Spectrometer for Automated and Robust Polypeptide Determination in Body Fluids for Clinical Use", Electrophoresis, 25, (2004),2044-2055.

Kaiser, Thorsten, et al., "Capillary Electrophoresis Coupled to Mass Spectrometry to Establish Polypeptide Patterns in Dialysis Fluids", Journal of Chromatography A, 1013, (2003), 157-171.

Kameoka, Jun, et al., "A Polymeric Microfluidic Chip for CE/MS Determination of Small Molecules", Anal. Chem., 73, (2001), 1935-1941.

Kameoka, Jun, et al., "A Scanning Tip Electrospinning Source for Deposition of Oriented", *Nanotechnology*, 14, (2003), 1124-1129.

Kameoka, Jun, et al., "An Arrow Shaped Silicon Tip for Polymeric Nanofiber Fabrication", *Journal of Photopolymer Science and Technology*, 16, (2003), 423-426.

Kameoka, Jun, et al., "An Electrospray Ionizatin Source for Integration with Microfluidics", *Anal. Chem*, 74, (2002), 5897-5901.

Kameoka, Jun, et al., "Fabrication of Oriented Polymeric Nanofibers on Planar Surfaces by Electrospinning", *Applied Physics Letters*, 83(2), (Jul. 14, 2003), 371-373.

Kameoka, Jun, et al., "Polymeric Nanowire Architecture", *Journal of Materials Chemistry*, 14, (2004), 1503-1505.

Kelly, John F., et al., "Capillary Zone Electrophoresis—Electrospray Mass Spectrometry at Submicroliter Flow Rates: Practical Considerations and Analytical Performance", *Anal. Chem.*, 69, (1997), 51-60.

Kim, Jin-Sung, et al., "Microfabricated PDMS Multichannel Emitter for Electrospray Ionization Mass Spectrometry", *J. Am. Soc. Mass Spectrom 2001*, 12, (2001), 463-469.

Kim, Jin-Sung, "Microfabrication of Polydimethylsiloxane electrospray ionization emitters", *Journal of Chromatography A*, 924, (2001), 137-145.

Kim, Jin-Sung, et al., "Miniaturized multichannel electrospray ionization emitters on poly(dimethylsiloxane) microfluidic devices", *Electrophoresis 2001*, 22, (2001), 3993-3999.

Kirby, Daniel P., et al., "A CE/ESI-MS Interface for Stable, Low-Flow Operation", *Anal. Chem.*, 68, (1996), 4451-4457.

Koutny, Lance B., et al., "Microchip Electrophoretic Immunoassay for Serum Cortisol", *Anal. Chem.*, 68, (1996), 18-22.

Larsson, Marita, "Transient isotachophoresis for sensitivity enhancement in capillary electrophoresis-mass spectrometry for peptide analysis", *Electrophoresis 2000*, 21, (2000), 2859-2865.

Lazar, Iulia M., et al., "Subattomole-Sensitivity Microchip Nanoelectrospray Source with Time-of-Flight Mass Spectrometry Detection", *Anal. Chem.*, 71, (1999), 3627-3631.

Lee, Edgar D., et al., "On-Line Capillary Zone Electrophoresis-ion spray tandem mass spectrometry for the determination of Dynorphins", *Journal of Chromatography*, 458, (1988), 313-321.

Li, Jianjun, et al., "Application of Microfluidic Devices to Proteomics Research", *Molecular & Cellular Proteomics 1.2*, (2002), 157-168.

Li, Jianjun, et al., "Rapid and Sensitive seperation of trace level protein digest using microfabricated devices coupled to a quadrupole—time-of-light mass spectrometer", *Electrophoresis 2000*, 21, (2000), 198-210.

Li, Jianjun, et al., "Separation and Identification of Peptides from Gel-Isolated Membrane Proteins Using a Microfabricated Device for Combined Capillary Electrophoresis/Nanoelectrospray Mass Spectrometry", *Anal. Chem.*, 72, (2000), 599-609.

Lin, Yuehe, et al., "Microfluidic Devices on Polymer Substrates for Bioanalytical Applications", 10 pages.

Liu, Hanghui, et al., "Development of Multichannel Devices with an Array of Electrospray Tips for High-Throughput Mass Spectrometry", *Anal. Chem.*, 72, (2000), 3303-3310.

Liu, Haiqing, et al., "Polymeric Nanowire Chemical Sensor", *Nano Letters*, 4, (2004), 671-675.

Moini, Mehdi, "Design and Performance of a Universal Sheathless Capillary Electrophoresis to Mass Spectrometry Interface USing a Split-Flow Technique", *Anal. Chem.*, 73, (2001), 3497-3501.

Neuhoff, Nils V., et al., "Mass spectrometry for the detection of differentially expressed proteins: a comparison of surface-enhanced laser desorption/ionization and capillary electrophoresis mass spectrometry", *Rapid Communications in Mass Spectrometry*, 18, (2004), 149-156.

Neususs, Christian, et al., "A robust approach for the analysis fo peptides in the low femtomole range by capillary electrophoresis—tandem mass spectrometry", *Electrophoresis 2002*, 23, (2002), 3149-3159.

Oleschuk, Richard D., et al., "Analytical microdevices for mass spectrometry", *trends in analytical chemistry*, vol. 19, No. 6, (2000), 379-388.

Olivares, Jose A., et al., "On-Line Mass Spectrometric Detection for Capillary Zone Electrophoresis", *Anal. Chem.*, 59, (1987), 1230-1232.

Paroni, Rita, et al., "Creatinine determination in serum by capillary electrophoresis", *Electrophoresis 2004*, 25, (2004), 463-468.

Premstaller, Andreas, et al., "High-Performance Liquid Chromayography—Electrospray Ionization Mass Spectrometry Using Monolithic Capillary Columns for Proteomic Studies", *Anal. Chem.*, 73, (2001), 2390-2396.

Ramsey, R S., et al., "Generating Electrospray from Microchip Devices Using Electroosmotic Pumping", *Anal. Chem.*, 69, (1997), 1174-1178.

Rocklin, Roy D., et al., "A Microfabricated Fluidic Device for Performing Two-Dimensional Liquid-Phase Separations", *Anal. Chem.*, 72, (2000), 5244-5249.

Rohde, E, et al., "Comparison of protein mixtures in aqueous humor by membrane preconcentration—capillary electrophoresis—mass spectrometry", *Electrophpresis 1998*, 19, (1998), 2361-2370.

Rohner, Tatiana C., et al., "Polymer Microspray with an Intergrated Thick-Flim Microelectrode", *Anal. Chem.*, 73, (2001), 5353-5357.

Sanz-Nebot, Victoria, et al., "Capillary electrophoresis coupled to time of flight-mass spectrometry of therapeutic peptide hormones", *Electrophoresis 2003*, 24, (2003), 883-891.

Schmitt-Kopplin, Philippe, et al., "Capillary electrophoresis—mass spectrometry: 15 years of developments and applications", *Electrophoresis 2003*, 24, (2003), 3837-3867.

Schultz, Gary A., et al., "A Fully Intergrated Monolithic Microchip Electrospray Device for Mass Spectrometry", *Anal. Chem.*, 72, (2000), 4058-4063.

Selby, D. S., et al., "Direct Quantification of Alkaloid Mixtures by Electrospray Ionization Mass Spectrometry", *Journal of Mass Spectrometry*, 33, (1998), 1232-1236.

Smith, Richard D., et al., "Capillary Zone Electrophoresis—Mass Spectrometry Using an Electrospray Ionization Interface", *Anal. Chem.*, 60, (1988), 436-441.

Smith, Richard D., et al., "New Developments in Biochemical Mass Spectrometry Electrospray Ionization", *Anal. Chem.*, 62, (1990), 882-899.

Srinivasan, Thara, "ESI and/or CE on Microfluidic Chips: Literature Review", (2002), 14 pages.

Stroink, Thom, et al., "On-line Coupling of Size Exclusion and Capillary Zone Electrophoresis via a Reversed-Phase C18 Trapping Column for the Analysis of Structurally Related Enkephalins in Cerebrospinal fluid", *Electrophoresis 2003*, 24(5), (2003), 897-903.

Svedberg, Malin, "Sheathless Electrospray from Polymer Microchips", *Anal. Chem.*, 75, (2003), 3934-3940.

Tang, Ning, "Current Developments in SELDI Affinity Technology", *Mass Spectrometry Reviews*, 23, (2004), 34-4.

Tang, Keqi, "Generation of Multiple Electrosprays Using Microfabricated Emitter Arrays for Improved Mass Spectrometric Sensitivity", *Anal. Chem.*, 73, (2001), 1658-1663.

Tempels, F. W. A., et al., "Chromatographic Preconcentration Coupled To Capillary Electrophoresis via an In-Line Injection Valve", *Anal. Chem.*, 76, (2004), 4432-4436.

Tomlinson, Andy J., et al., "Investigation of drug metabolism using capillary electrophoresis with photodiode array detection and on-line mass spectrometry equipped with an array detector", *Electrophoresis*, 15, (1994), 62-71.

Tomlinson, Andy J., et al., "Systematic development of on-line membrane preconcentration-capillary electrophoresis—mass spectrometry for the analysis of peptide mixtures", *J. Cap. Elec.*, 002:5, (1995), 225-233.

Tomlinson, Andy J., et al., "Utility of Membrane Preconcentration-Capillary Electrophoresis—Mass Spectrometry in Overcoming Limited Sample Loading for Analysis of Biologically Derived Drug Metabolites, Peptides, and Proteins", *J. Am. Soc. Mass Spectrom*, 8, (1997), 15-24.

Valaskovic, Gary A., et al., "Automated Orthogonal Control System for Electrospray Ionization Mass Spectrometry", *New Objective*, 1-5.

Villanueva, Josep, et al., "Serum Peptide Profiling by Magnetic Particle-Assisted, Automated Sample Processing and MALDI-TOF Mass Spectrometry", *Anal. Chem.*, 76, (2004), 1560-1570.

Von Brocke, Alexander, et al., "Recent advances in capillary electrophoresis/electrospray—mass spectrometry", *Electrophoresis*, 22, (2001),1251-1266.

Wachs, Timothy, et al., "Electrospray Device for Coupling Microscale Separations and Other Miniaturized Devices with Electrospray Mass Spectrometry", *Anal. Chem.*, 73, (2001),632-638.

Wang, Michael Z., et al., "Analysis of Human serum proteins by liquid phase isoelectric focusing and matrix-assisted laser desorption/ionization-mass spectrometry", *Proteomics*, 3, (2003),1661-1666.

Wen, Jenny, et al., "Microfabricated isoelectric focusing device for direct electrospray ionization-mass spectrometry", *Electrophoresis 2000*, 21, (2000),191-197.

Whitt, Jacob T., et al., "Capillary Electrophoresis to Mass Spectrometry Interface Using a Porous Junction", *Anal. Chem.*, 75, (2003),2188-2191.

Wittke, Stefan, et al., "Determination of peptides and proteins in human urine with capillary electrophoresis-mass spectrometry, a suitable tool for the establishment fo new diagnostic markers", *Journal of Chromatography A*, 1013, (2003),173-181.

Wright, Jr., GL, et al., "Proteinchip surface enhanced laser desorption/ionization (SELDI) mass spectrometry: a novel protein biochip technology for detection of prostate cancer biomakers in complex protein mixtures", *Prostate Cancer and Prostatic Diseases*, 2, (1999),264-276.

Xue, Qifeng, et al., "Multichannel Microchip Electrospray Mass Spectrometry", *Anal. Chem.*, 69, (1997),426-430.

Yarin, A L., et al., "Taylor cone and jetting from liquid droplets in electrospinning of nanofibers", *Journal of Applied Physics*, 90(9), (Nov. 1, 2001),4836-4846.

Zhang, Bailin, et al., "A Microdevice with Integrated Liquid Junction for Facil Peptide and Protein Analysis by Capillary Electrophoresis/Electrospray Mass Spectrometry", *Anal. Chem.*, 72, (2000),1015-1022.

Zhang, B, et al., "Microfabricated Devices for Capillary Electrophoresis-Electrospray Mass Spectrometry", *Anal. Chem.*, 71, (1999),3258-3264.

Zhu, Xiaofeng, et al., "A Colloidal Graphite-Coated Emitter for Sheathless Capillary Electrophoresis/Nanoelectrospray Ionization Mass Spectrometry", *Anal. Chem.*, 74, (2002),5405-5409.

"U.S. Appl. No. 10/951,254, Non-Final Office Action mailed Apr. 3, 2008", 33 pgs.

"U.S. Appl. No. 10/951,254, Restriction Requirement mailed Jan. 4, 2008", 6 pgs.

"U.S. Appl. No. 10/951,254 Final Office Action Mailed On Oct. 20, 2008", FOAR, 12 Pgs.

"U.S. Appl. No. 10/951,254, Response filed Jul. 31, 2008 to Non Final Office Action mailed Apr. 3, 2008.", 10 pgs.

"U.S. Appl. No. 10/951,254, Response to Restriction Requirement mailed Feb. 4, 2008 in Response to Restriction Requirement mailed Jan. 4, 2008", 9 pgs.

Kameoka, et al., "Nanotechnology", 14, (Sep. 5, 2003), 1124-1129.

* cited by examiner

MICROFIBER SUPPORTED NANOFIBER MEMBRANE

RELATED APPLICATION

This application is a continuation in part of and claims priority from U.S. patent application Ser. No. 10/951,254; filed on Sep. 27, 2004; which is incorporated herein by reference.

This application is related to U.S. patent application Ser. No. 10/394,757 (entitled Electrospray Emitter for Microfluidic Channel, filed May 21, 2003).

GOVERNMENT FUNDING

The invention described herein was made with U.S. Government support under Grant Number ECS-9876771 awarded by National Science Foundation (NSF)/Nanobiotechnology Center (NBTC). The United States Government has certain rights in the invention.

FIELD OF THE INVENTION

The present invention relates to nanofiber filters, and in particular to a nanofiber filter supported by microfibers.

BACKGROUND OF THE INVENTION

Due to their extremely small porous dimensions and high surface to volume ratio, nanofibers have been expected to be utilized as substrates for many applications such as high performance waste water filtration or biological contaminants filtration membranes. However, there has been little sign of potential products or usage of nanofibers for these applications because of their weak mechanical strength. The average dimension of nanofibers are less than 100 nm and sometimes as small as 20 nm. In this dimension, although they are layered and formed as thick membranes, the mechanical strength of the resulting structures is not sufficient to withstand macroscopic impacts for filtration applications such as normal liquid or air flows passing through them.

SUMMARY OF THE INVENTION

Nanofibers are formed on a microfiber membrane material to provide structural integrity. In one embodiment, the nanofibers are formed using electrospray deposition from a microfluidic source. In one embodiment, the source is an electrospray source, such as a microfabricated tip provides a solution from an electrostatically formed Taylor cone formed on the tip. Distances between source and surface, as well as solution viscosity may be varied to form nanofiber membranes with differing properties.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

An electrospray system is first described for creating nanofibers formed of various materials. A method for forming and supporting nanofiber membranes is then described, along with the resulting structure. The nanofiber membranes may be formed on microfiber membranes, and the resulting structure may be used as a filter in one embodiment. Various methods of forming the nanofiber membranes other than the electrospray system may also be used.

Figure 1:
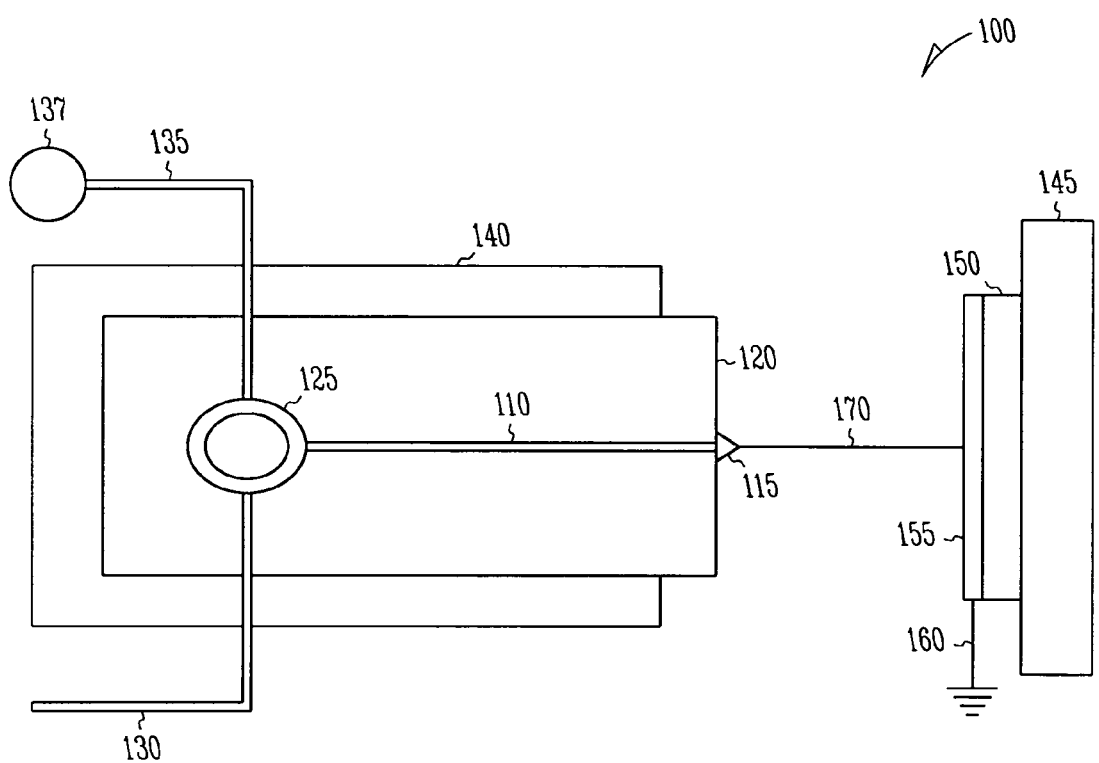
FIG. 1 is a block diagram of an electrospinning system for creating polymer nanofibers according to an example embodiment of the invention.

A microfluidic electrospray system is shown at 100 in FIG. 1. A microfluidic channel 110 is coupled at one end to a triangular tip 115, acting as a source for formation of nanofibers. Both are supported by a substrate 120. A reservoir 125 provides a polymer solution in one embodiment to the channel 110 and to the tip 115. Another end of the microfluidic channel 110 is coupled to a reservoir 125 formed in the substrate 120. The reservoir in one embodiment is coupled to a capillary tube 130, or other plumbing to provide the polymer solution to the reservoir and channel. A conductor, such as a gold wire 135 is coupled to the reservoir for coupling the reservoir to a power supply 137. The substrate is mounted on an x,y,z stage for moving the substrate laterally in a desired manner.

In one embodiment, the substrate 120 is positioned between approximately 5 mm to 12.5 mm from holder 145 on which a silicon substrate 150 with aluminum coating 155 is supported. The substrate and aluminum coating 155 are coupled to a ground via a conductor 160, forming a counter electrode. By applying a potential via power supply 137 with respect to the grounded substrate 150, a Taylor cone is established on tip 115, resulting in a liquid jet 170 being formed at the tip and moving toward the substrate 150. In one embodiment, the term Taylor cone is used to refer to any type of structure that result in a thin stream of liquid moving toward the substrate 150. By moving the substrate 120 by use of the x,y,z stage 140, the liquid jet moves across the substrate 150, creating nanofibers on the substrate in desired positions. Z corresponds to the distance between the tip and the substrate. Stage 140 may be moved to create a membrane of substantially randomly oriented fibers. In further embodiments, no x,y stage need be used, and the substrate may be positioned proximate the tip 115 to produce nanofibers in a desired position on the substrate.

The term "nanofibers" is meant to cover fibers within the dimensions described herein, and smaller fibers.

The microfluidic coupling allows new possibilities for materials processing and nanostructure formation. The source allows for smaller source to substrate distances and permits operation at lower voltages than conventional sources. The shorter distance, referred to as a deposition distance, enables greater control of nanofiber morphology and more localized deposition of the fibers. In one embodiment, nanofibers are formed within a 5 mm diameter circle on the substrate 150.

In one example, the electrospray device substrate 120 is attached on the x,y,z stage 140 and adjusted to form a deposition distance between the tip 115 and counter electrode/substrate of approximately 0.5 cm to 1.5 cm. A 300 nl/minute flow rate is created by coupling a syringe pump to the capillary tube 130. A potential is applied to the wire 135 of approximate 2000V to 8500V.

Approximately 500 nm of aluminum is optionally sputter-deposited on the silicon wafer and used as the counter electrode for nanofiber deposition. In one embodiment, the counter electrode is attached to a rotating optical chopper, with rotation rate varied between 40 RPM to 800 RPM. In a further embodiment, nanofibers are directly deposited on the silicon wafer without the need for the Al layer. In this embodiment, the silicon wafer acts as the counter electrode.

Figure 2:
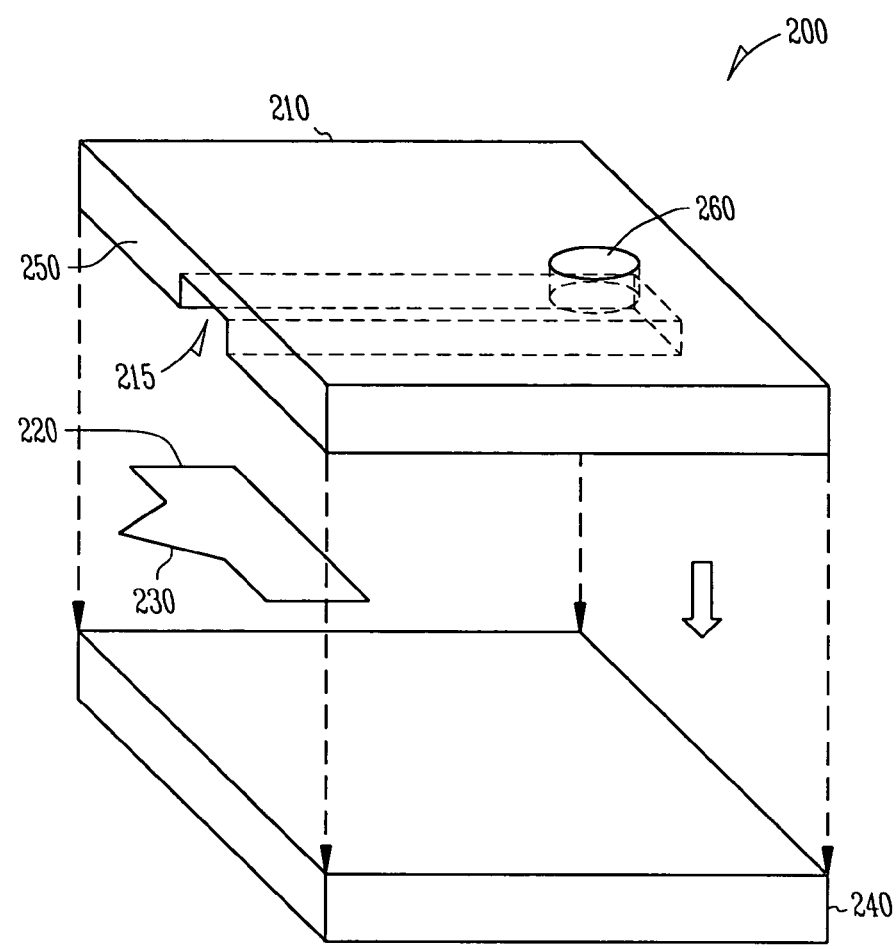
FIG. 2 is an exploded block view example of a channel with integrated electrospray emitter according to an embodiment of the invention.

Further detail of an electrospray device is shown at 200 in FIG. 2. In one embodiment, a top chip 210 has a microchannel 215 embossed therein. The device further comprises an emitter film 220, having a triangular or trapezoidal shaped tip 230. It should be noted that any type of source, such as commercially available electrospray sources may be used to provide an electrospray of desired materials in addition to the sources described herein. Electrospray techniques involve the use of an applied voltage to extract material from a surface.

In one embodiment, the emitter comprises a larger body portion that is rectangular, with the tip 230 extending from the rectangular portion. A bottom chip 240 is thermally bonded with the top chip 210, sandwiching a portion of the emitter film to hold it firmly between the chips. In one embodiment, the film covers a portion of the length of the channel at one end of the bonded chips as indicated at 250. The tip 230 extends laterally from the channel at end 250. A reservoir 260 is coupled to the other end of the channel 215.

The triangle tip 230 is approximately 3 um thick, and acts like a nozzle or wick that prevents liquid from spreading laterally at the exit of the fluidic channel. In one embodiment, the tip has an apex with an approximately 90 degree angle, and the angles adjacent the channel are approximately 45 degrees. The angle of the apex may be varied, such as between 40 and 120 degrees. At smaller apex angles, liquid may spread at the base of the triangle contacting the microchannel chip, as the wetting angle of solutions in the channel may be smaller than the angles the base of the triangle makes with the chip. Different apex angles may be optimal for solutions with different wetting angles. The base of the triangular tip is approximately 100 micrometers, and the height is approximately 50 micrometers. Thus, the base extends well beyond both sides of the channel when centered approximately at the center of the channel.

Figure 3:
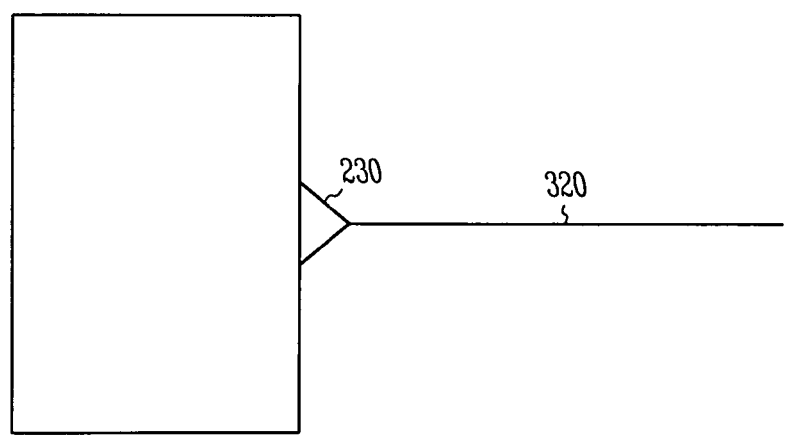
FIG. 3 is a representation of a Taylor cone established on a tip of an emitter in FIG. 2 according to an example embodiment of the invention.

The shape of the tip 230 helps form and fix a position of a Taylor cone, as shown in FIG. 3. When a difference in potential is applied to the device, a liquid droplet with a critical curvature for establishing a Taylor cone is formed at the apex of the triangle. A liquid jet 320 is formed at the apex. Highly charged small liquid droplets are made extending toward the counter electrode. Excess electrostatic force extracts liquid from the apex of the Taylor cone to establish the liquid jet. Other shapes of emitter film may also be used, such as trapezoidal shaped emitter films. While an electrospray emitter is described as the source for nanofibers, other sources may also be used to create oriented nanofibers.

Polyethylene oxide was used as the nanofiber solution in one embodiment. It was prepared by dissolving PEO monomer (MW 100,000) at weight concentration of 6% to 10% in a mixture of 50% deionized water and 50% ethanol. Other concentrations may also be used. PEO polymeric solution is electrosprayed to the rotational counter electrode. The deposition distance is set at 2 cm and the position of the triangular tip was set at 2.0 cm laterally away from the center of the counter electrode. In addition to PEO, there are many organic such as polyaniline, poly lactic acid or inorganic solutions like silica that may be used.

For a spinning process, a flow rate of 300 nl/minute is maintained with the syringe pump. 7000V was applied to the gold wire at the fluid source with the metalized substrate at ground potential. A Taylor cone is maintained at the apex of the triangle tip with a stable total ion current of 15 nA.

In various embodiments, nanofiber size and morphology depend on process parameters, which may be varied significantly. Such parameters include the deposition distance, applied electric field strength, and rotational speed of the counter electrode. At smaller deposition distances, the polymer may arrive at the counter electrode as a solution, resulting in a structure resembling a membrane with holes, rather than fibers. In one embodiment, the deposition distance is set to 0.75 cm, and a Taylor cone is established with 3500V applied to the gold electrode. This resulted in approximately 14.8 nA of total ion current and columnar nanofibers with an average diameter of 200 nm. Nanofibers appear to have partially dried while traveling to the counter electrode.

With a distance of approximately 1.0 cm, a Taylor cone is established at about 4000V, and an ion current of about 14.5 nA. Thinner nanofibers are formed in this case, with an average diameter of approximately 100 nm. With a distance of 1.5 cm, the Taylor cone is also established at 4000V, resulting in columnar nanofibers with an average diameter of approximately 100 nm.

From the above examples, the nanofiber size decreased from 200 nm to 100 nm while the deposition distance was increased from 0.5 cm to 1.0 cm. Extension of the deposition distance to more than 1.0 cm may not influence the nanofiber diameter. Once the fibers form in transit, the nanofiber size appears to be fixed, and the fibers are deposited on the surface as a solid.

Applied electric field strength was varied from 4000 V/cm to 8500 V/cm at a distance of 1.0 cm in one example embodiment. At 4000 V/cm, cylindrical nanofibers are formed with an average diameter of 100 nm. At 5500 V/cm, the diameter is almost the same, but branched nanofibers with small diameter of 30 to 60 nm may be fabricated between the main nanofibers.

In one embodiment, various solutions of PEO may be used. Weight concentrations of 5, 10, 20 and 30% of PEO in a solvent of 50% deionized water and 50% ethanol may be utilized. Other concentrations may also be used, as well as entirely different solutions that are capable of forming wires.

Polyaniline (PANI) (48 mg, emeraldine base; Mw approximately 20,000, purchased from Aldrich, Wis., USA) may be dissolved in chloroform (1.5 ml) and doped with 10-camphorsulfonic acid (122 mg). PEO (48 mg, $M_w$ approximately 900,000 purchased from Aldrich) may be added to the chloroform solution and stirred overnight. The concentration of PEO/PANI-HCSA may range from 0.5 to 2.0 wt. %. The amount of PEO mixed with PA may be varied from 10 to 80 wt. % in one embodiment.

In one embodiment, a Taylor cone is established with a potential of 4500 V applied to a 20 ul dropet and the counter electrode. Nanofibers may be generated for approximately 5 to 10 seconds. The length of the nanofiber is controlled by the volume of the droplet loaded on the tip. The length may also be controlled by controlling the potential. Removing the potential at desired times results in removing the Taylor cone, and hence stopping production of the nanofiber at a desired time and distance. Nanofibers may be deposited immediately after the polymeric solution is loaded to reduce effects of evaporation. In addition to the arrow shaped tip, triangle-shaped and straight metal wire tips may be employed. It may be more difficult to establish a Taylor cone with some tip shapes.

Diameters of nanofibers deposited from the various solutions may be in the 100 to 200 nm range for the 5% solution, 200-300 nm range for 10%, 300-500 nm for 20% and 500 to 1800 nm range for 30%. The polymer viscosity increases with concentration. The viscosity of a 30% solution is very high. Lower viscosity solutions appear to result in smaller diameter fibers.

Deposition distance may also be varied. In one embodiment, the distance is varied between 0.5 to 1.5 cm with a PEO solution of 10%. The counter electrode is not spun in this embodiment. Changes may be observed in the nanofiber morphology. In the case of a 0.5 cm deposition distance, deposited polymer resembles a membrane. This may be the result of the short transit distance, in which the polymer may arrive at the counter electrode as a wet polymer, allowing them to merge to form larger fibers, or bond together to make a fibrous web. At a distance of 0.75 cm, cylindrical nanofibers may be formed of diameter 200 to 850 nm range. In this case, the nanofibers appear to have partially dried while traveling to the counter electrode. At 1.0 cm distances, thinner nanofibers appear to be created, having average diameters of approximately 153 nm. A 5% solution resulted in nanofibers as small as 45 nm.

In one embodiment, the tips may be reused after surface cleaning. A wide range of polymeric material, such as highly viscous polymeric solutions can be electrospun from the tip. The short deposition distance as compared to syringe based electrospinning provides for easy control of the orientation of the nanofibers. The tips also provide the capability of electrospinning of colloidal suspensions mixed with a polymer solution to fabricate nanofibers composite materials. In addition to the formation of nanofibers, tips may be used to electrospray liquids, chemicals and for particulate deposition on a surface.

In still further embodiments, a solution of poly(methyl methacrylate) (PMMA) is used for fiber formation. 4 wt. % and 5.5 wt. % PMMA solutions may be prepared by dissolving 67.2 mg and 92.4 mg of PMMA (Mw 495,000) in 2 ml of anisole (phenyl methyl ether), respectively. A pipette or other type of applicator may be utilized to provide 30 ul of solution on the silicon tip. A voltage of 4000 to 7000 V may be applied between the tip and counter electrode to establish the Taylor cone and extract a liquid jet from its apex.

Target substrates may include many different materials, such as silicon, aluminum, thin film aluminum on silicon, and non-conducting substrates, such as silicon dioxide, silicon nitride, glass slides, cover slips and others. Such non-conductive substrates are mounted on the counter electrode in the path of the extracted liquid jet.

With highly volatile solvents in the solution used to form a Taylor cone may be stable only for several seconds prior to evaporation. A side effect of such volatile solvents appears to be the formation of more than one polymer liquid jet being extracted from a silicon tip per deposition cycle. This may lead to fibers of different sizes being deposited on the same substrate. When multiple polymer jets are extracted, the diameters of such jets may have very small diameters. Reducing the size of the microfabricated tip may also consistently create nanofibers with very small diameters.

In one embodiment, using the 4 wt. % solution of PMMA in anisole, fibers were produced having an average diameter of approximately 85.2 nm. Fibers deposited using 4 wt. % solution of PMMA range from 81.4 to 326.5 nm with an average of 190 nm. Fibers deposited using 5.5 wt. % solution of PMMA range from 88.5 to 346 nm with an average of 206 nm.

The smallest diameter fibers extracted from the solutions were deposited when more than one polymer jet was extracted from the silicon tip. The multiple jets produced fibers of various sizes, instead of a single jet producing fibers of approximately the same size.

Figure 4:
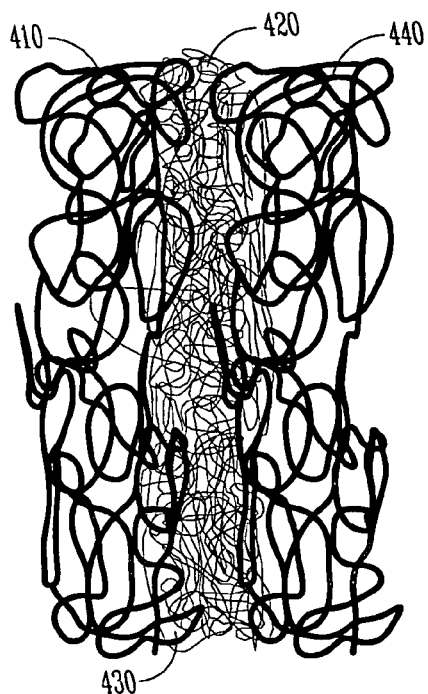
FIG. 4 is a schematic cross section diagram of a nanofiber membrane supported by a microfiber membrane according to an example embodiment of the invention.

In one embodiment, a microfiber membrane or filter 410 in FIG. 4 may be supported on the counter electrode. The nanofibers are then formed directly onto the microfiber membrane 410 to form a nanofiber membrane 420. In one embodiment, the nanofibers arrive at the microfiber membrane 410 at least partially wet. This state provides a tight bonding with the microfiber and also helps the nanofibers bond together to form a membrane with increased structural integrity. The microfiber membrane provides mechanical strength for the resulting microfiber supported nanofiber membrane 420.

In one embodiment, an integration region 430 is formed where the nanofibers penetrate into the microfibers various distances. The distances are a function of the relative diameters of the fibers, and the force at which the nanofibers are projected towards the microfiber membrane 410. Whether or not the nanofibers are not completely dried, the penetration also provides a bond between the resulting microfiber and nanofiber membranes. If the nanofibers are at least partially wet on arrival, a spun thermal bond may result, and provide good adhesion of the nanafibers to the microfibers.

In one embodiment, the microfiber membrane may be formed directly on the counterelectrode or a substrate coupled to the counterelectrode. The nanofibers may then be spun onto the microfiber membrane. In various embodiments, different materials may be interposed between the membranes, or the nanofiber membrane may be formed directly onto the microfiber membrane. In further embodiments, the nanofiber membrane may be produced independently of the microfiber membrane, and then placed onto it. The membranes may then be held together by suitable adhesive, or mechanical frame or other means of coupling the membranes.

A second microfiber membrane 440 may be placed over the nanofiber membrane to provide a filter type structure that has support for the nanofiber membrane from both sides. This second microfiber membrane 440 may be held in place may many different means as described above, or may be formed directly onto the nanofiber membrane using known microfiber deposition processes. If applied in a partially wet manner, the adhesion may be increased.

In one embodiment, the microfiber membranes may have diameters in the um range, or may be larger if desired. In further embodiments, other filter type substrates may be used to support nanofiber membranes, such as ceramic filters, nano porous membrane filter or ion exchange membrane filter.

Figure 5:
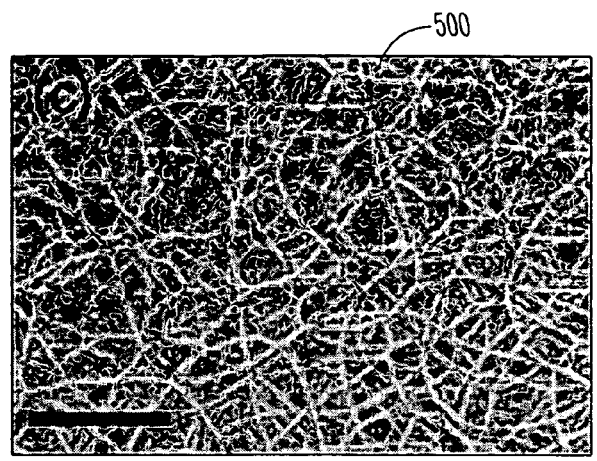
FIG. 5 is a scanning electron microscope image of a nanofiber membrane according to an example embodiment of the invention.

FIG. 5 is a scanning electron microscope image of a nanofiber membrane 500 according to an example embodiment of the invention. A scale bar 510 indicates 5 um. A conventional membrane type filter typically consists of fibers of 20-50 micrometer in diameter. The mean pore size is approximately 50 um. On the other hand, the mean pore size of nanofiber membrane is much smaller as illustrated at 500. The average pore size in one embodiment is less than 100 nm. (Pore size is usually described as the diameter of pore.) This is very suitable for capturing ultra fine particles or molecules, and also provides a significant difference of surface to volume ratio over microfiber membranes.

The weak point of nanofibers with average diameters of less than 100 nm was the mechanical resistibility for the air or liquid flow. Because of this weakness, it was difficult to commercialize the nanofiber based filtration product, although it has vast potential. By direct electrospinning of nanofibers onto the microfiber substrates as well as the construction of another layer of microfibers on the surface of nanofiber membrane a mechanically stable filtration membrane is created. Because of the high surface to volume ratio, the nanofiber membrane can significantly improve the filtration performance, such as the capture of nicotine molecules in tobacco smoke.

In one embodiment, the nanofibers are blown or formed to provide a membrane that is between approximately 20 nm to 1 um thick, with nanofiber diameters of approximately 100 to 200 um. The microfiber membrane may be approximately 10 um to 100 um or thicker in various embodiments, depending on the amount of structural support desired. In one embodiment, the diameter of the nanofibers and thickness of the nanofiber layers are selected as a function of molecule size to be filtered. For smaller molecule sizes, smaller diameter nanofibers may be used to decrease the resulting pore size in the membrane. The thickness of the membrane may also be increased. For larger molecule sizes, larger diameter nanofiber may be used in a thinner layer if desired.

Figure 6:
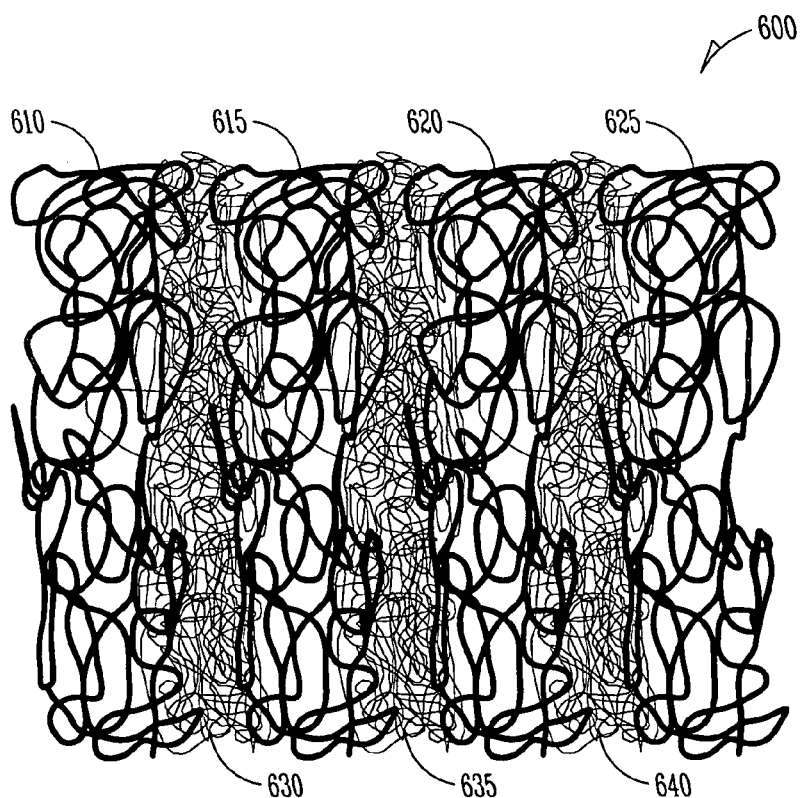
FIG. 6 is a schematic cross section diagram of multiple nanofiber membranes supported by multiple microfiber membranes according to an example embodiment of the invention.

One layer of nanofibers may be sufficient for many air filter applications. Liquid applications may require a microfiber layer on both sides of the nanofiber membrane. In still further embodiments, a second nanofiber membrane may be formed on top of the second microfiber membrane as illustrated in FIG. 6 at 600. Still further layers of nanofibers and microfibers may be added to form a stacked sandwich of microfiber and nanofiber membranes. Four microfiber membranes, 610, 615, 620 and 625 sandwich three nanofiber membranes 630, 635 and 640 in one embodiment. Still further layers may be added if desired.

As previously mentioned, the microfiber membranes may be formed in many different manners, such as by deposition. The nanofiber membranes may be formed using the above described electrospray device, or by other means, that may not include the use of a tip as described. The diameter of the fibers and thicknesses of the resulting membranes may be varied for different applications. Further, the number of layers of nanofiber membranes and microfiber membranes may also be varied.

The invention claimed is:

1. A method of forming a nanofiber filter, the method comprising:
   positioning a microfiber filter and counter electrode a desired distance from a microfluidic emitter, the emitter having a triangular tip with an apex;
   providing a polymer to the microfluidic emitter; and
   applying a potential between the microfluidic emitter and the microfiber filter to electrospray nanofibers from a Taylor cone formed at the apex of the triangular tip onto the microfiber filter.

2. The method of claim 1 wherein at least a portion of the nanofibers are penetrating a surface of the microfiber filter.

3. The method of claim 2 wherein the desired distance is short enough such that the nanofibers are not dry when initially contacting the microfiber filter.

4. The method of claim 1 wherein the desired distance is between approximately 0.5 cm to 2.0.

5. The method of claim 1 wherein the applied potential is between 2000 V and 8500 V.

6. The method of claim 1 wherein the polymer is provided to the triangular tip by dipping the tip in the polymer.

7. The method of claim 1 wherein the polymer is provided to the triangular tip by an applicator.

8. The method of claim 1 wherein the polymer is selected from the group consisting of PEG, HDPC, and PMMA.

9. The method of claim 1 wherein the nanofibers are approximately between 100 to 200 nm in diameter.

10. The method of claim 1 wherein the nanofibers form a membrane approximately 20 nm to 1 um thick.

11. A method of forming a filter, the method comprising:
    positioning a microfiber membrane and counter electrode a desired distance from a microfluidic emitter having a triangular tip with an apex;
    providing a nanofiber forming solution to the microfluidic emitter; and
    applying a potential between the microfluidic emitter and the counter electrode to electrospray nanofibers from a Taylor cone formed at the apex of the triangular tip onto the microfiber membrane.

12. The method of claim 11 and further comprising adding a second microfiber membrane over the nanofibers.

13. The method of claim 11 and further comprising forming additional layers of nanofibers and microfiber membranes.

14. The method of claim 11 wherein the nanofibers form a membrane that is integrated into a portion of the microfiber membrane.

15. The method of claim 14 wherein the nanofiber membrane has an average pore size of less than approximately 100 $nm^2$.

* * * * *

UNITED STATES PATENT AND TRADEMARK OFFICE
CERTIFICATE OF CORRECTION

PATENT NO. : 7,591,883 B2
APPLICATION NO. : 11/262550
DATED : September 22, 2009
INVENTOR(S) : Jun Kameoka et al.

It is certified that error appears in the above-identified patent and that said Letters Patent is hereby corrected as shown below:

In column 1, line 4, delete "APPLICATION" and insert -- APPLICATIONS --, therefor.

In column 8, line 21, in Claim 4, delete "2.0." and insert -- 2.0 cm. --, therefor.

In column 8, line 29, in Claim 8, delete "PEG," and insert -- PEO, --, therefor.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,591,883 B2  Page 1 of 1
APPLICATION NO. : 11/262550
DATED : September 22, 2009
INVENTOR(S) : Kameoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 815 days.

Signed and Sealed this

Twenty-first Day of September, 2010

David J. Kappos
*Director of the United States Patent and Trademark Office*